United States Patent
Notsu et al.

(10) Patent No.: US 6,907,950 B2
(45) Date of Patent: Jun. 21, 2005

(54) HYBRID VEHICLE SYSTEM

(75) Inventors: Ikurou Notsu, Ageo (JP); Akihito Okazaki, Ageo (JP); Masakazu Sasaki, Ageo (JP); Shougo Nishikawa, Ageo (JP); Mitsuhiro Nishina, Ageo (JP); Hideaki Gouda, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 0 days.

(21) Appl. No.: 10/415,003

(22) PCT Filed: Mar. 30, 2001

(86) PCT No.: PCT/JP01/02825

§ 371 (c)(1),
(2), (4) Date: Apr. 23, 2003

(87) PCT Pub. No.: WO02/36382

PCT Pub. Date: May 10, 2002

(65) Prior Publication Data

US 2004/0026141 A1 Feb. 12, 2004

(30) Foreign Application Priority Data

Oct. 31, 2000 (JP) .................................... 2000-332963

(51) Int. Cl.[7] .............................. B60K 1/00; B60L 8/00
(52) U.S. Cl. ................... 180/65.7; 180/65.2; 180/65.4; 180/65.3
(58) Field of Search .............................. 180/65.2, 65.3, 180/65.4, 65.6, 65.7

(56) References Cited

U.S. PATENT DOCUMENTS

| | | | | |
|---|---|---|---|---|
| 5,495,906 A | * | 3/1996 | Furutani ................... | 180/65.2 |
| 5,713,814 A | * | 2/1998 | Hara et al. ................ | 477/5 |
| 5,806,617 A | * | 9/1998 | Yamaguchi ............... | 180/65.2 |
| 5,828,201 A | | 10/1998 | Hoffman, Jr. et al. | |
| 5,846,155 A | * | 12/1998 | Taniguchi et al. ......... | 477/2 |
| 5,847,520 A | * | 12/1998 | Theurillat et al. ......... | 318/139 |
| 5,927,415 A | * | 7/1999 | Ibaraki et al. ............. | 180/65.2 |
| 6,022,290 A | * | 2/2000 | Lyon .......................... | 477/108 |
| 6,059,059 A | * | 5/2000 | Schmidt-Brucken ....... | 180/65.3 |
| 6,090,007 A | * | 7/2000 | Nakajima et al. .......... | 477/146 |
| 6,166,499 A | * | 12/2000 | Kanamori et al. ......... | 318/139 |
| 6,484,833 B1 | * | 11/2002 | Chhaya et al. ............. | 180/65.4 |
| 2002/0050259 A1 | * | 5/2002 | Kojima .................... | 123/179.3 |

FOREIGN PATENT DOCUMENTS

| | | |
|---|---|---|
| JP | 03-113167 | 5/1991 |
| JP | 11-160759 | 6/1999 |
| JP | 11-289605 | 10/1999 |
| JP | 2000-203287 | 7/2000 |

* cited by examiner

Primary Examiner—Christopher P. Ellis
Assistant Examiner—G B Klebe
(74) Attorney, Agent, or Firm—Rabin & Berdo P.C.

(57) ABSTRACT

A hybrid vehicle system comprises an engine (1), a gearbox (4), a clutch (3) for engaging or disengaging the gearbox (4) with or from the engine (1), a rotating machine (2), a power transmission mechanism (5) for transmitting the rotation of the rotating machine (2) to the gearbox, and a capacitor (7) for storing electric power supplied from the rotating machine (2). A control unit (20) computes the drive force required by the vehicle, and determines the portion of output to be produced by the rotating machine (2) according to the stored energy in the capacitor (7) and the portion of output to be produced by the engine (1) so that the drive force requirement may be satisfied. The outputs from the rotating machine (2) and the engine (1) are controlled to obtain the determined portions of output, and a clutch (3) is then engaged.

3 Claims, 6 Drawing Sheets

MOTOR BRAKING
(REGENERATION)

MOTOR ELECTRICITY
GENERATION

ELECTRICITY GENERATION
DURING TRAVEL

HYBRID VEHICLE SYSTEM

TECHNICAL FIELD

This invention relates to a so-called parallel type hybrid system wherein an engine and a rotational electric motor (motor/generator) are provided as power sources of a vehicle.

BACKGROUND ART

Japanese Patent Application No. H11-160759 discloses a parallel type hybrid system which comprises: an engine, a transmission device for gearing the speed of rotation of an input shaft and transmitting said rotation to vehicle wheels via an output shaft, a clutch for engaging and disengaging the output shaft of the engine and the input shaft of the transmission device, a rotational electric device serving as an electric motor and an electric generator, a power transmission mechanism for coupling the input and output shafts of the rotational electric device with the input shaft of the transmission device, and an accumulator element for accumulating electrical power supplied by the rotational electric device.

In prior applications of this kind, if the amount of electrical charge accumulated in the accumulator element is sufficient, then the clutch is disengaged, and the vehicle is caused to accelerate or travel under the driving force of the rotational electric device. If the electrical power is consumed by driving operation of the rotational electric device and the accumulated charge in the accumulator element declines, then it is no longer possible to obtain an output corresponding to the required driving force (amount of operation of the accelerator) for the vehicle, from the rotational electric device.

Therefore, if the accumulated charge in the accumulator element falls to or below a prescribed value, the clutch is engaged and the traveling state of the vehicle is continued by means of driving force from the engine. In this case, the driving operation of the rotational electric device is limited to accelerating or low speed running, and hence the operational range of the engine becomes large, and sufficient improvement in fuel consumption or reduction in exhaust gases cannot be achieved.

SUMMARY OF THE INVENTION

The object of the present invention is to expand the operational range of the rotational electric device, thereby improving the fuel consumption and exhaust characteristics.

The hybrid system for a vehicle according to the present invention comprises:

an engine, a transmission device for gearing the speed of rotation of an input shaft and transmitting said rotation to vehicle wheels via an output shaft, a clutch for engaging and disengaging the output shaft of the engine and the input shaft of the transmission device, a rotational electric device serving as an electric motor and an electric generator, a power transmission mechanism for coupling the input and output shafts of the rotational electric device with the input shaft of the transmission device, and an accumulator element for accumulating electrical power supplied by the rotational electric device. Moreover, it also comprises: means for calculating the required driving force of a vehicle; means for determining the output load allotted to the rotational electric device and the output load allotted the engine in accordance with the accumulated charge in the accumulator element, in such a manner that the aforementioned required driving force is satisfied; and control means for controlling the output of the rotational electric device and the engine in such a manner that the respective allotted output loads are achieved, and engaging said clutch.

Therefore, according to the present invention, even if the accumulated charge of an accumulator element has declined, it is still possible to set an operational range wherein the distributed output of the rotational electric device and the distributed output of the engine are used in combination when the vehicle is traveling. Consequently, it is possible to utilize the accumulated charge of the accumulator element to the maximum in the driving force of the vehicle, whilst maintaining the required driving force of the vehicle. In other words, the operational range in which the vehicle is driven (caused to travel) by the engine alone is restricted, thereby contributing greatly to improvement of fuel consumption and reduction of exhaust gases. Moreover, since the clutch is engaged after the input rotation of the transmission device has approximately matched the engine rotation, it is possible to reduce the shock when the clutch is engaged.

Preferably, when engaging the clutch when the accumulated charge is at or below a prescribed value, the clutch is engaged after the rotation of the input shaft of said transmission device has approximately matched the rotation of the engine.

BEST MODE FOR CARRYING OUT THE INVENTION

Figure 1:
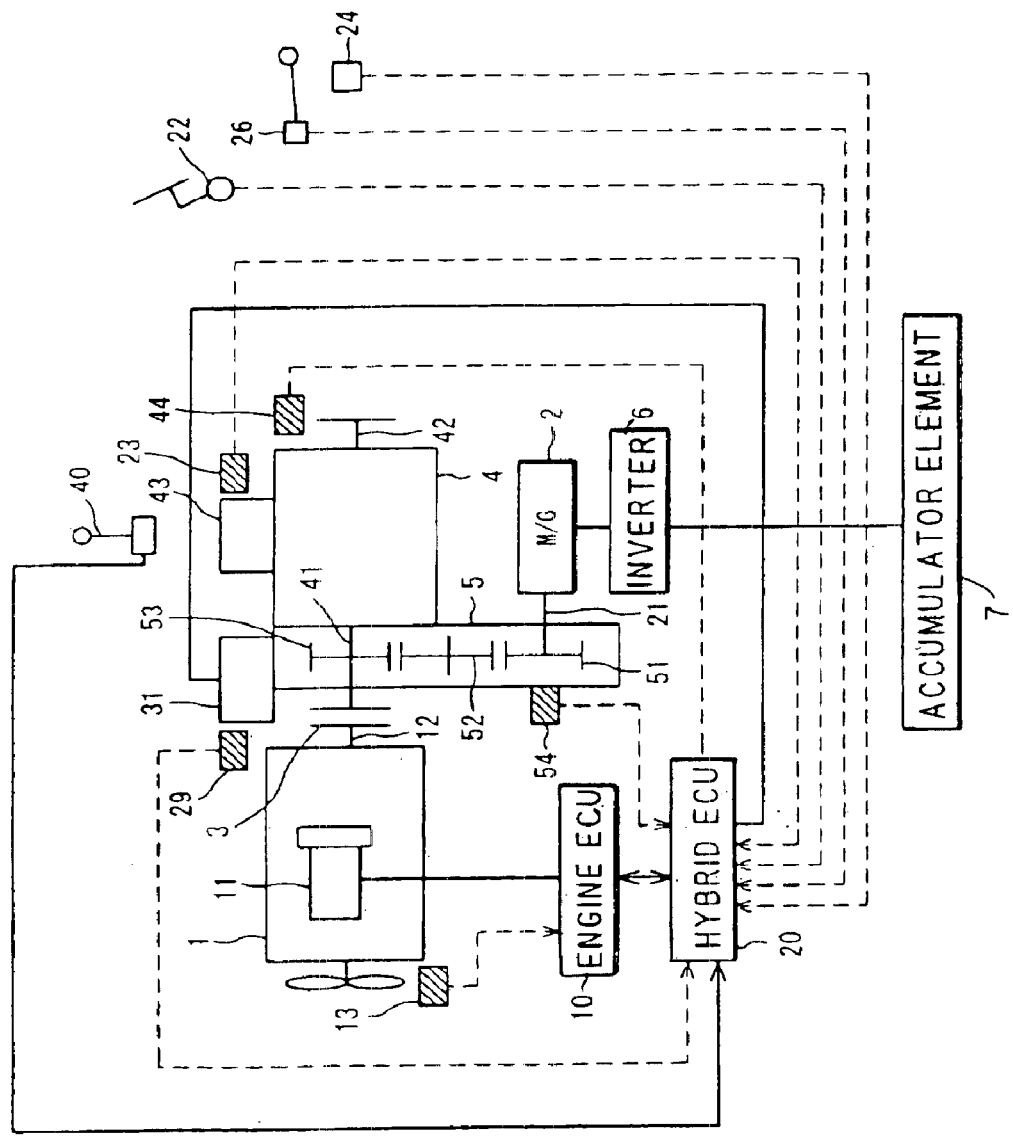
FIG. 1 is a system overview showing an embodiment of the invention.

As shown in FIG. 1, the power train of a vehicle comprises: an engine 1, a transmission 4 (transmission device), and a clutch 3 interposed between the output shaft 12 (crank shaft) of the engine 1 and the input shaft 41 of the transmission 4.

The output of the engine 1 is transmitted via the clutch 3 to the input shaft 41 of the transmission 4, and during travel of the vehicle, it is further transmitted from the output shaft 42 of the transmission 4, via a propeller shaft, differential gears, and drive shafts, to the left and right-hand wheels of the vehicle.

The engine 1 is constituted by a diesel engine or CNG engine (using compressed natural gas as a fuel). The output of the engine 1 is controlled by an electronic engine control unit (ECU) 10, as described hereinafter.

The clutch 3 is controlled so as to engage and disengage by means of a clutch actuator 31, and the transmission 4 performs gear changing by means of a gear shift actuator 43.

The power train of the vehicle comprises a motor/generator 2, and a power transmission mechanism 5 for coupling the input/output shaft 21 of the motor/generator 2 with the input shaft 41 of the transmission 4.

The motor/generator 2 uses a permanent magnet type synchronous electric motor (IPM synchronous motor). The motor/generator 2 is connected to the accumulator element 7 via an inverter 6.

The inverter 6 converts the stored electrical power (DC power) of the accumulator element 7 into AC power and supplies it to the motor/generator 2, which is driven as an electric motor. The inverter 6 also converts power generated by the motor/generator 2 (AC power) into DC power and stores it in the accumulator element 7.

In the accumulator element 7, in order to generate braking energy efficiently and rapidly, without causing waste, an electric double-layer capacitor is used, which can readily guarantee the output density required with respect to the tolerable weight of the vehicle battery.

The power transmission mechanism 5 is constituted by a drive gear 51 coupled to the input/output shaft 21 of the motor/generator 2, a driven gear 53 coupled to the input shaft 41 of the transmission 4, and an idle gear 52 which meshes with the aforementioned gears.

The output rotation of the motor/generator 2 is geared down by means of the power transmission mechanism 5 and transmitted to the input shaft 41 of the transmission 4. When the vehicle is regenerating energy, the rotation of the input shaft 41 of the transmission 4 is geared up by means of the power transmission mechanism ,5 and transmitted to the input shaft 21 of the motor/generator 2, thereby performing an electrical power generating action.

A hybrid ECU 20 is provided in order to control the aforementioned clutch 3, transmission 4, inverter 6, engine ECU 10, and so on.

The hybrid ECU 20 is input with various signals from the change lever unit 23 which generates a gear position command corresponding to the position of the change lever for changing gear; an accelerator opening sensor 22 which detects the amount by which the accelerator pedal is depressed (accelerator demand amount), a brake sensor 26 which detects the amount by which the brake is operated (level of use of the brake, or brake demand amount); a sensor 44 which detects the output revolution speed of the transmission 4; a sensor 54 which detects the gear revolution speed in the power transmission mechanism 5 (transmission 4 input revolution speed sensor); a clutch position sensor 29 which detects engagement of the clutch 3; a meter 24 which detects the stored charge (SOC) of the accumulator element 7; and (although not illustrated in the drawings), a gear position sensor which detects the shift position of the transmission 4, and the like. Furthermore, it is also supplied with a detection signal from the engine revolution sensor 13 which is input to the engine ECU 10.

The hybrid ECU 20 controls the clutch actuator 31, gear shift actuator 43 and inverter 6 on the basis of the various signals described above and information signals from the engine ECU 10, and it also sends engine output request signals to the engine ECU 10.

Moreover, the hybrid ECU 20 and the engine ECU 10 are connected in a bi-directional fashion by means of communications control means, in such a manner that various types of cooperative control can be performed, as described hereinafter.

The details of the control performed by the hybrid ECU 20 are now described.

Figure 2:
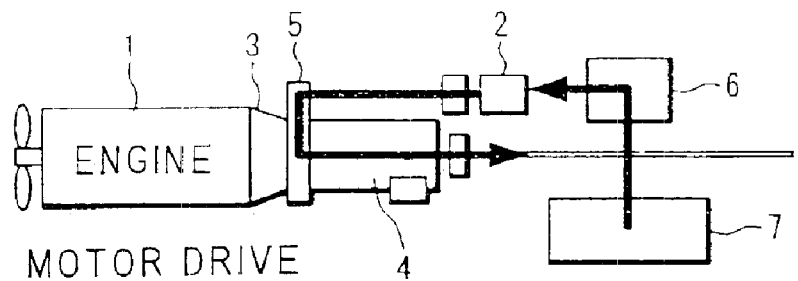
FIG. 2 is a schematic view showing power flow.

When the vehicle is accelerating or running under the output of the motor/generator 2 only, then it controls the inverter 6 in such a manner that an output corresponding to the operational amount (level of use) of the accelerator is obtained from the motor/generator 2, in a state where the clutch 3 is disengaged. The output of the motor/generator 2 is transmitted via the power transmission mechanism 5 to the input shaft 41 of the transmission 4, as shown in FIG. 2, and the rotation is transmitted from the output shaft 42 of the transmission 4 to the propeller shaft.

Figure 3:
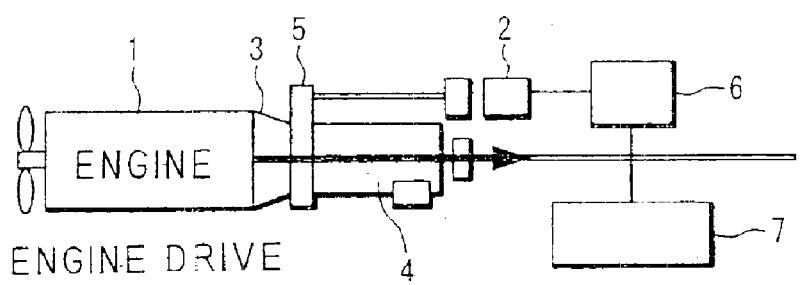
FIG. 3 is a schematic view showing power flow.

When the vehicle is traveling under the output of the engine 1 only, then an output request signal is sent to the engine ECU 10, and the operation of the motor/generator 2 is halted, in a state where the clutch 3 is engaged. The engine ECU 10 controls the amount of fuel supplied to the engine 1 in such a manner that an output corresponding to the amount of operation of the accelerator is obtained, and this output of the engine 1 is transmitted via the clutch 3 to the input shaft 41 of the transmission 4, as shown in FIG. 3, and then from the output shaft 42 of the transmission 4 to the propeller shaft.

Figure 4:
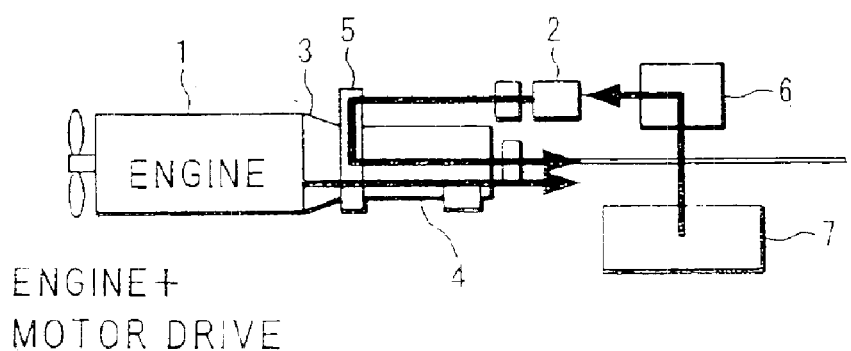
FIG. 4 is a schematic view showing power flow.

If the output of the motor/generator 2 and the output of the engine 1 are to be used in combination during travel of the vehicle, then in addition to sending an output request signal to the engine ECU 10, with the clutch 3 in an engaged state, the hybrid ECU 20 also controls the inverter 6 in such a manner that output is also obtained from the motor/generator 2. The output of the motor/generator 2 is transmitted to the input shaft 41 of the transmission 4 via the power transmission mechanism 5, as illustrated in FIG. 4, and then passes via the current transmission gear and is transmitted from the output shaft 42 of the transmission 4 to the propeller shaft, together with the output supplied from the engine 1 via the clutch 3.

Figure 5:
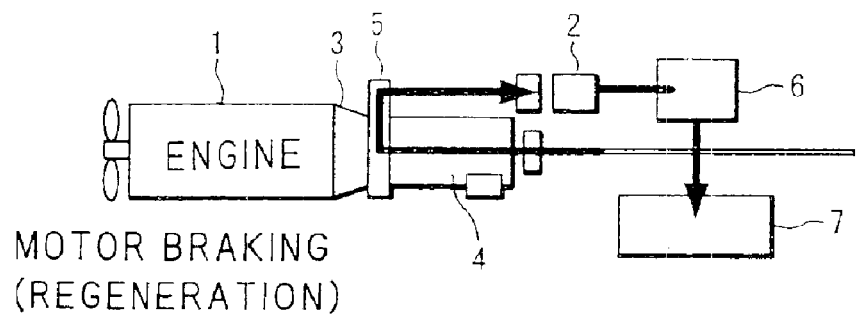
FIG. 5 is a schematic view showing power flow.

When the vehicle is braking, provided that it is possible to store charge in the accumulator element 7, the inverter 6 is controlled in such a manner that the motor/generator 2 is caused to generate electrical power from the regenerated braking force which accompanies the braking action. The rotation of the vehicle wheels is transmitted from the propeller shaft, via the output shaft 42 of the transmission 4, to the input shaft 41 thereof, and then via the power transmission mechanism 5, to the input/output shaft 21 of the motor/generator 2, as illustrated in FIG. 5. Thereby, regenerated electricity is created by the motor/generator 2 and this electrical power passes via the inverter 6 and is used to charge up the accumulator element 7. In other words, the energy of the vehicle when decelerating is converted to electrical energy by the electrical generation process of the motor/generator 2 and is recovered in the accumulator element 7. The shortfall in the brake demand amount can be made up by braking force from electronically controlled brakes (not illustrated), or the like.

Figure 6:
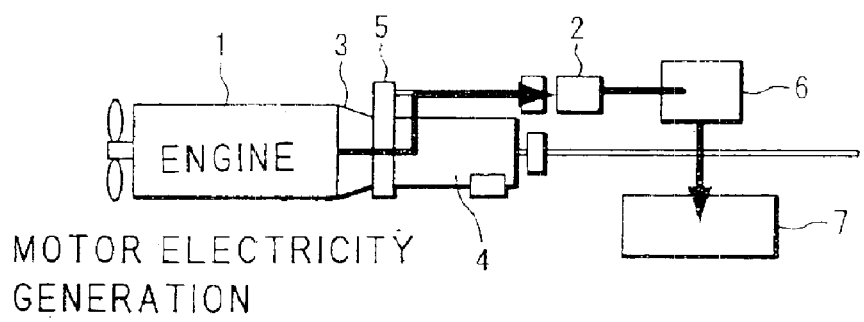
FIG. 6 is a schematic view showing power flow.

When charging up the accumulator element 7 whilst the vehicle is stationary, the clutch 3 is engaged with the transmission 4 set to neutral. As illustrated in FIG. 6, the rotation of the engine 1 is transmitted from the clutch 3 to the input shaft 41 of the transmission 4, the power transmission mechanism 5, and the input/output shaft 21 of the motor/generator 2. Consequently, the motor/generator 2 generates electricity due to the output of the engine 1, and this electrical power charges up the accumulator element 7.

Figure 7:
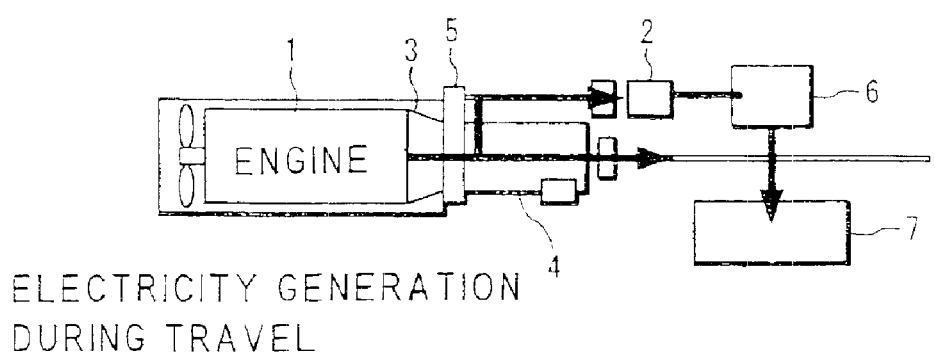
FIG. 7 is a schematic view showing power flow.

In order to charge up the accumulator element 7 when the vehicle is traveling under the output of the engine 1 only (see FIG. 3), the motor/generator 2 is caused to operate as an electric motor. As illustrated in FIG. 7, the output of the engine 1 is transmitted via the clutch 3 to the input shaft 41 of the transmission 4, and then transmitted via the output shaft 42 of the transmission 4 to the propeller shaft, as well as being transmitted via the power transmission mechanism 5 to the input/output shaft 21 of the motor/generator 2.

Although the hybrid ECU 20 generates the required driving force by means of the motor/generator 2 only, by disengaging the clutch 3, when the vehicle is accelerating or running as described above, it also causes efficient operation to be performed by adding the output of the engine 1 to the driving force in accordance with the amount of electrical charge stored in the accumulator element 7.

In other words, when the accumulated charge in the accumulator element 7 has declined, it determines the output load of the motor/generator 2 in accordance with the accumulated charge, without halting the operation of the motor/generator 2, and uses the motor/generator 2 in combination with the engine 1, thereby extending the operational range of the motor/generator 2 whilst maintaining the required driving force.

Figure 8:
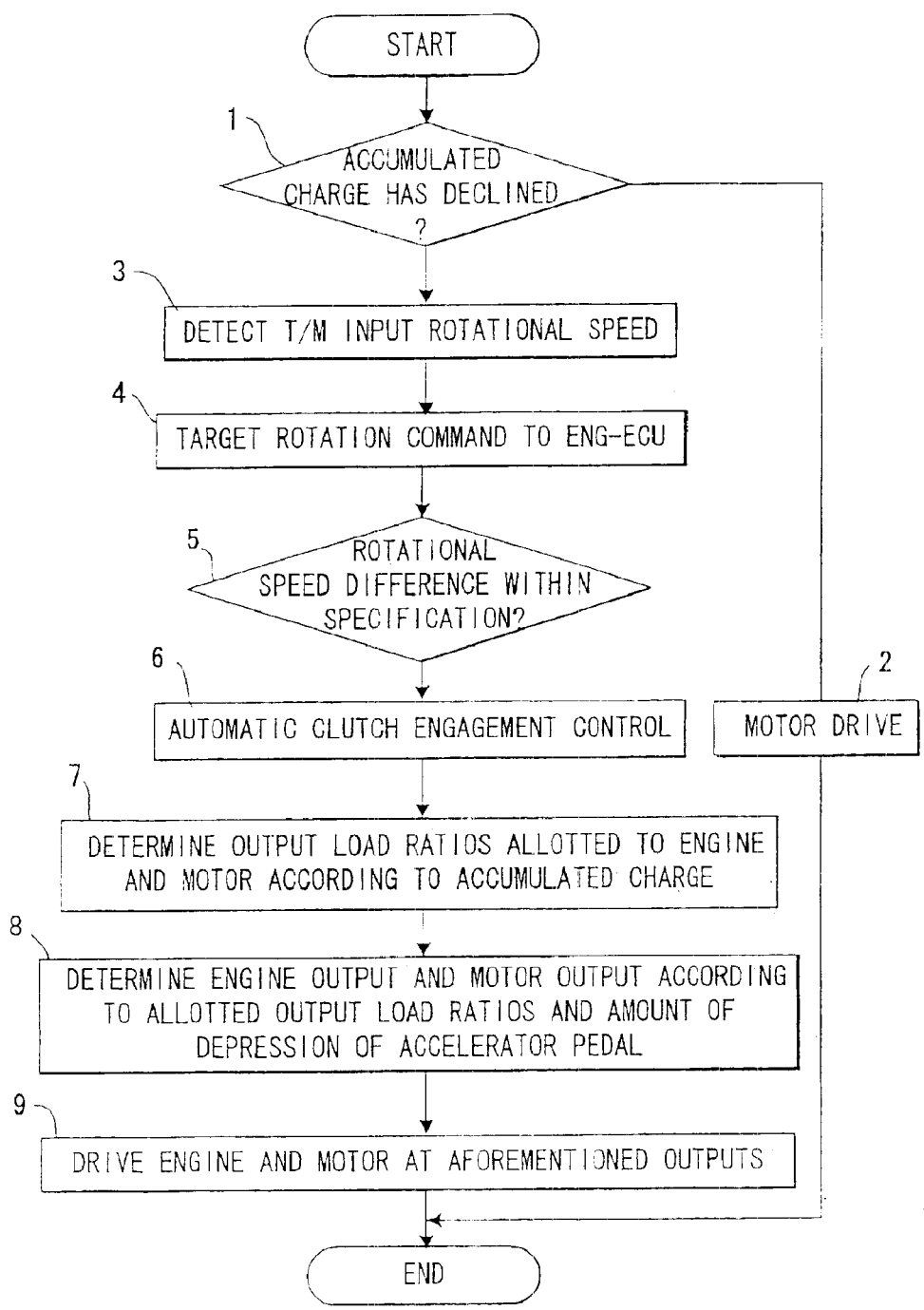
FIG. 8 is a schematic flowchart view.

FIG. 8 is a flowchart for this control procedure, which is executed at prescribed control intervals in the hybrid ECU 20.

At step 1, it is determined whether or not the amount of electrical charge stored in the accumulator element 7 is at or below a prescribed value. If the result of this judgement is "no", in other words, if the amount of accumulated charge is sufficient, then the procedure advances to step 2, and the vehicle is driven by means of the output of the motor/generator 2 only, with the clutch 3 in a disengaged state. In this case, the inverter 6 is controlled in such a manner that an output corresponding to the amount of operation of the accelerator is obtained from the motor/generator 2.

In step 1, if the accumulated charge is at or below the prescribed value, then the procedure advances to step 3–step 9.

Figure 9:
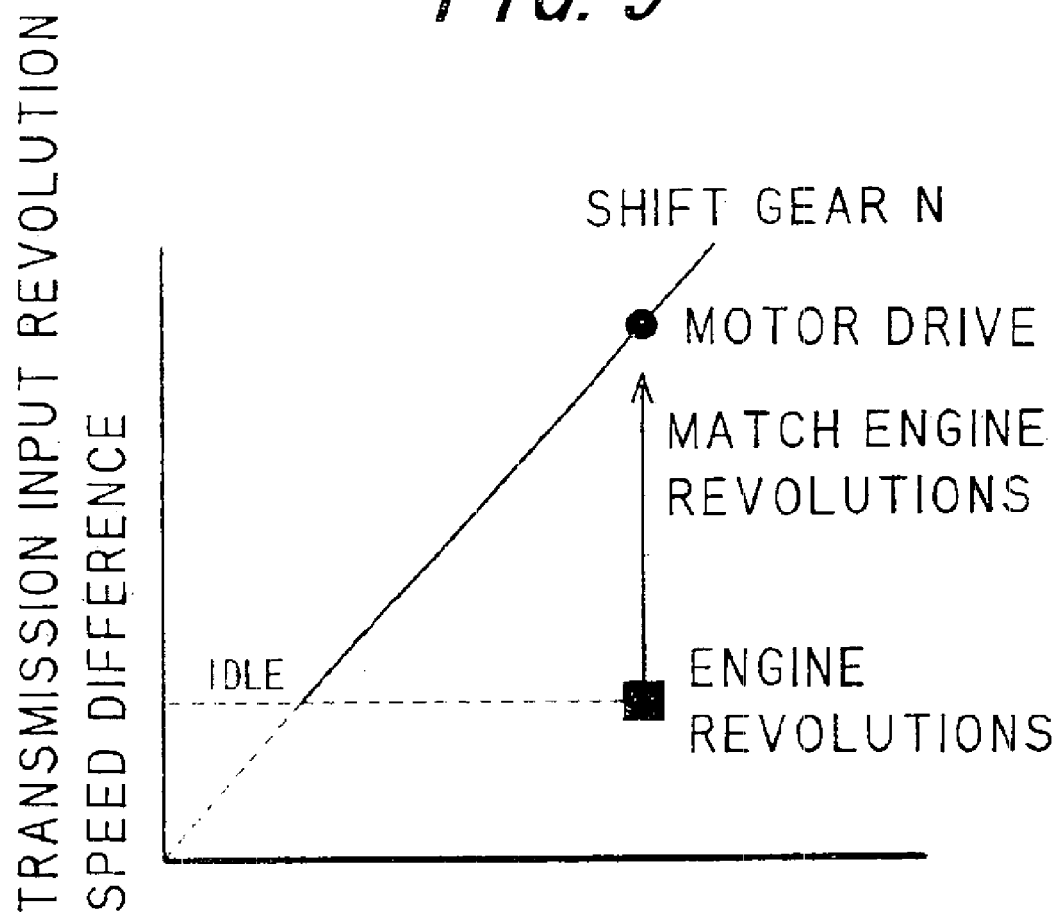
FIG. 9 is a graphical view.

In step 3, the rotational speed of the input shaft of the transmission 4 (detection signal of the rotational sensor 54) is read in. At step 4, a command (request signal) for controlling the engine 1 is sent to the engine ECU 10, taking the rotational speed of the input shaft 41 of the transmission 4 as the target rotational speed. Thereby, the rotational speed of the engine 1 is raised from idle rotation in a standby state to the rotational speed of the input shaft 41 of the transmission 4, as illustrated in FIG. 9.

In step 5, the rotational speed of the output shaft 12 of the engine (detection signal of rotational sensor 13) is read in and it is determined whether or not the difference between this rotational speed and the rotational speed of the input shaft 41 of the transmission 4 is at or below a prescribed value.

If the judgement result is "no", then the procedure returns to step 3, the aforementioned operation is repeated, and the engine revolutions are successively increased, whereas if the result is "yes", in other words, if the rotational speed difference is at or below the specified value, then the procedure advances to step 6 and the clutch 3 is engaged. Thereby, it is possible to engage the clutch 3 in a state of low shock.

Figure 10:
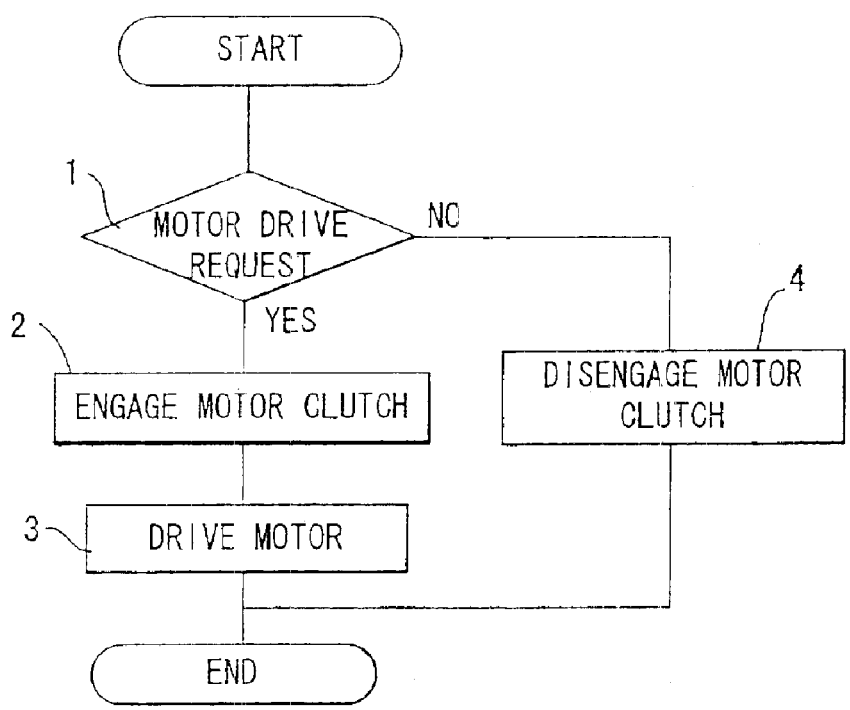
FIG. 10 is a map showing the ratios of output loads alloted to an engine and motor.

Thereupon, at step 7, the ratio of output load allotted to the engine 1 and the ratio of output load allotted to the motor/generator 2 are determined from the control map in FIG. 10, on the basis of the accumulated charge in the accumulator element 7.

This map specifies the ratios of the output loads allotted to the engine 1 and the motor/generator 2, using the accumulated charge (SOC) in the accumulator element 7 as a parameter. The greater the accumulated charge, the greater the output load allotted to the motor/generator 2, and the smaller the accumulated charge, the higher the ratio of output load allotted to the engine 1.

At step 8, the actual output of the engine 1 and output of the motor/generator 2 are determined on the basis of the ratios of allotted output loads thus determined and the current amount of operation of the accelerator.

Thereupon, at step 9, an output request signal corresponding to the output load allotted to the engine 1 is sent to the engine ECU 10, and the inverter 6 is controlled in such a manner that the allotted output load is obtained from the motor/generator 2.

In this way, if the accumulated charge (SOC) in the accumulator element 7 is sufficient, then the vehicle is accelerated or driven by means of the output of the motor/generator 2 only, with the clutch 3 in a disengaged state.

On the other hand, if the electrical power is consumed by the driving operation of the motor/generator 2 and the amount of accumulated charge has declined to a prescribed value or below, then the clutch 3 is engaged and supplementary output is provided from the engine 1, thereby making it possible to expand the operational range of the motor/generator 2 whilst satisfying the required driving characteristics of the vehicle. As the accumulated charge declines, the output load on the motor/generator 2 is reduced, and hence the accumulator element 7 is prevented from discharging completely. Thereby, the operational range of the motor/generator 2 is expanded compared to cases where all of the output is switched to the engine 1, when the accumulated charge has fallen to or below a specified value, and hence the fuel consumption and exhaust characteristics can be improved accordingly.

If the output of the engine 1 is applied, then when the clutch 3 is engaged from a disengaged state, the difference between the rotational speed of the output shaft 12 of the engine 1 and the rotational speed of the input shaft 41 of the transmission 4 will be equal to or less than a prescribed value, and hence it is possible to prevent shocks when the clutch is engaged.

In the control map in FIG. 10, if there is sufficient accumulated electrical charge in the accumulator element 7 (namely, the charge exceeds a prescribed value), then the ratio output load allotted to the motor/generator 2 becomes 1 (100%), and if the accumulated charge in the accumulator element 7 falls to or below a prescribed value, then the ratio of output load allotted to the motor/generator 2 is gradually reduced from 1 to 0 (0%), along with the fall of the electrical charge, whilst the ratio of output load allotted to the engine 1 is increased from 0 to 1 accordingly, and if the accumulated charge falls below a minimum allowable limit, then the ratio of output load allotted to the engine becomes 1.

Therefore, by combining use of the output of the motor/generator 2 and the output of the engine 1 during travel of the vehicle (step 7 to step 9). it is possible to utilize the accumulated charge of the accumulator element 7 to the maximum during travel of the vehicle. whilst maintaining the driving force corresponding to the amount of operation of the accelerator. In other words, the operational range in which the vehicle is driven (caused to travel) by the engine 1 alone is restricted. thereby contributing greatly to improvement of fuel consumption and reduction of exhaust gases.

The present invention is a parallel hybrid drive system which can be used as a drive source for a vehicle.

What is claimed is:

1. A hybrid system for a vehicle comprising an engine, a transmission device for changing the speed of rotation of an input shaft and transmitting the rotation to vehicle wheels via an output shaft, a clutch for engaging or disengaging the output shaft of the engine with or from the input shaft of the transmission device, a rotational electric device serving as an electric motor and an electric generator, a power transmission mechanism for coupling the input and output shafts of the rotational electric device with the input shaft of the transmission device, and an accumulator element for accumulating electrical power supplied by the rotational electric device, comprising:

means for calculating the required driving force of a vehicle;

means for determining the output load allotted to the rotational electric device and the output load allotted to the engine in accordance with the accumulated charge in the accumulator element, in such a manner that the aforementioned required driving force is satisfied, wherein said determining means sets the ratios of output loads allotted to the rotational electric device and the engine are set in such a manner that, if the accumulated charge exceeds a prescribed value, the ratio of output load allotted to the rotational electric device is 1, and if the accumulated charge is at or below the prescribed value, the ratio of output load allotted to the rotational electric device is gradually reduced from 1 in accordance with the decline in the accumulated charge, while the ratio of output load allotted to the engine is increased from zero in accordance therewith; and control means for controlling the outputs of the rotational electric device and the engine in such a manner that the respective allotted output loads are achieved, and engaging said clutch.

2. The hybrid system for a vehicle according to claim 1, wherein said control means performs control to release said clutch when the accumulated charge exceeds a prescribed value, so that the vehicle is driven by the output of said rotational electric device alone.

3. The hybrid system for a vehicle according to claim 2, wherein said control means performs control so that, when engaging said clutch when the accumulated charge is at or below a described value, the clutch is engaged after the rotation of the input shaft of said transmission device has approximately matched the rotation of the engine.

* * * * *